(12) United States Patent
Li et al.

(10) Patent No.: US 10,775,553 B1
(45) Date of Patent: Sep. 15, 2020

(54) FRAME STRUCTURE, BACKLIGHT MODULE AND DISPLAY DEVICE

(71) Applicants: Hefei BOE Vision-Electronic Technology Co., Ltd., Hefei (CN); BOE TECHNOLOGY GROUP CO., LTD., Beijing (CN)

(72) Inventors: Xiaojin Li, Beijing (CN); Guangning Hao, Beijing (CN)

(73) Assignees: Hefei BOE Vision-Electronic Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/820,869

(22) Filed: Mar. 17, 2020

(30) Foreign Application Priority Data

Sep. 19, 2019 (CN) .................... 2019 2 1562769 U

(51) Int. Cl.
*F21V 8/00* (2006.01)
*G02F 1/13357* (2006.01)
*G02F 1/1333* (2006.01)

(52) U.S. Cl.
CPC ..... *G02B 6/0086* (2013.01); *G02F 1/133308* (2013.01); *G02F 1/133608* (2013.01); *G02F 2001/133314* (2013.01); *G02F 2001/133317* (2013.01)

(58) Field of Classification Search
CPC ........ G02F 2001/133311; G02F 2001/133314; G02F 2001/133317; G02F 1/133603–133611; G02B 6/0086–0091
See application file for complete search history.

(56) References Cited

U.S. PATENT DOCUMENTS

2014/0104538 A1\* 4/2014 Park .................. G02F 1/133608
349/60

FOREIGN PATENT DOCUMENTS

| CN | 209356802 U | * | 9/2019 |
| CN | 209373961 U | * | 9/2019 |
| CN | 210200182 U | * | 3/2020 |
| CN | 210270458 U | * | 4/2020 |

\* cited by examiner

*Primary Examiner* — Mariceli Santiago
(74) *Attorney, Agent, or Firm* — Thomas | Horstemeyer LLP

(57) ABSTRACT

A frame structure is described that includes a back plate having a first side wall; a middle frame assembled on the back plate, the middle frame having a second side wall located outside the first side wall; a buckle assembled on the first side wall, the buckle including a buckle elastic slice, where the buckle elastic slice is located between the first side wall and the second side wall, a retreat space exists between the buckle elastic slice and the first side wall, the buckle elastic slice has a buckle portion and a disassembly slot, the buckle portion protrudes in a direction close to the second side wall and be located inside the position limiting slot, and the disassembly slot is recessed in a direction away from the second side wall and has a notch opposite to the disassembly opening.

13 Claims, 3 Drawing Sheets

FRAME STRUCTURE, BACKLIGHT MODULE AND DISPLAY DEVICE

CROSS-REFERENCE TO RELATED APPLICATION

This application is based upon and claims priority to Chinese Patent Application No. 201921562769.7, filed on Sep. 19, 2019, the entire contents thereof are incorporated herein by reference.

TECHNICAL FIELD

The present application relates to the technical field of displays and, more particularly, relates to a frame structure, a backlight module, and a display device.

BACKGROUND

Currently, the back plate and the middle frame of the liquid crystal display products are usually connected together with fasteners such as screws, etc. In this way, on one hand, the product appearance quality is reduced and user experience is greatly reduced. On the other hand, it is adverse to the disassembly between the middle frame and the back plate, and the maintenance efficiency of the liquid crystal display equipment is greatly reduced.

It should be noted that the information disclosed in the above mentioned background section is only used to enhance the understanding of the background of the present application, so it can include information that does not constitute the prior art known to those skilled in the art.

SUMMARY

In a first aspect, the present application provides a frame structure, where the frame structure includes:

a back plate having a first side wall;

a middle frame assembled on the back plate, where the middle frame has a second side wall located outside the first side wall, and a position limiting portion protruding in a direction close to the first side wall is arranged on the bottom end of the second side wall, where the position limiting portion and the second side wall surround to form a position limiting slot, and a disassembly opening connected with the outside is arranged between the position limiting portion and the first side wall;

a buckle assembled on the first side wall, where the buckle includes a buckle elastic slice located between the first side wall and the second side wall, and there is a retreat space between the buckle elastic slice and the first side wall, and the buckle elastic slice has a buckle portion and a disassembly slot, and the buckle portion protrudes in a direction close to the second side wall and be located inside the position limiting slot, and the disassembly slot is recessed in a direction away from the second side wall and has a notch opposite to the disassembly opening.

In an example embodiment of the present application, a plurality of buckle portions are arranged and distributed on the opposite sides of the disassembly slot.

In an example embodiment of the present application, at least one first positioning portion is arranged on the inner side surface of the first side wall.

The buckle further includes a first fixing slice located on the inner side of the first side wall and a connecting slice connecting the first fixing slice and the buckle elastic slice, where the first fixing slice has a first match portion engaged with the first positioning portion.

In an example embodiment of the present application, the first positioning portion is a positioning slot, where the first match portion is a positioning latch, and the positioning latch is engaged inside the positioning slot.

In an example embodiment of the present application, the first fixing slice includes a fixed main body portion and an inclined guide portion, where the fixed main body portion has the first match portion, and the inclined guide portion is arranged on the bottom end of the fixed main body portion and is inclined in a direction away from the first side wall.

In an example embodiment of the present application, an installation slot is arranged on the top surface of the first side wall, where the connecting slice is installed in the installation slot.

In an example embodiment of the present application, the thickness of the connecting slice is less than or equal to the slot depth of the installation slot.

In an example embodiment of the present application, the buckle further includes a second fixing slice connected with the connecting slice, where the second fixing slice is located between the first side wall and the second side wall.

In an example embodiment of the present application, a second positioning portion is arranged on the outer side surface of the first side wall, and the connecting slice has a second match portion engaged with the second positioning portion.

In an example embodiment of the present application, the second positioning portion is a positioning protrusion, where the second match portion is a positioning through-hole, and the positioning protrusion is engaged inside the positioning through-hole.

In an example embodiment of the present application, the second fixing slice and the buckle elastic slice are in a spaced arrangement.

In an example embodiment of the present application, a plurality of the second fixing slices are arranged and distributed on the opposite sides of the buckle elastic slice.

In a second aspect, the present application provides a backlight module, where the backlight module includes a light-emitting component and the frame structure described in any of the foregoing examples or embodiments, and the light-emitting component is arranged on the inner side of the first side wall.

In a third aspect, the present application provides a display device, where the display device includes a display panel and the above-mentioned backlight module, and the display panel is assembled on one side of the middle frame away from the back plate.

It should be understood that the above general description and the following detailed description are only examples and explanatory, and should not limit the present application.

BRIEF DESCRIPTION OF THE DRAWINGS

The accompanying drawings herein are incorporated in the specification and constitute a part of the specification. The accompanying drawings illustrate embodiments consistent with the present application, and are used together with the specification to explain the principles of the present application. Understandably, the accompanying drawings in the following description are only some embodiments of the present application. For those skilled in the art, other accompanying drawings can also be obtained according to these accompanying drawings without any creative effort.

DETAILED DESCRIPTION

Figure 1:
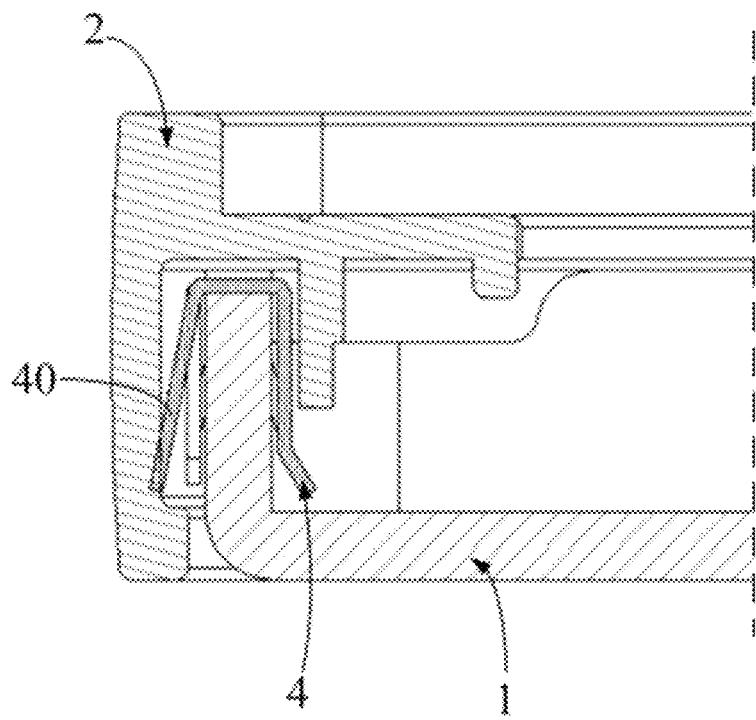
FIG. 1 shows the partially cross-sectional view of a frame structure described in an embodiment of the present application.

Example embodiments will now be described more fully with reference to the accompanying drawings. However, the example embodiments can be embodied in many manners, and should not be understood as limited to the embodiments set forth herein. On the contrary, these embodiments are provided so that the present application will be comprehensive and integrated, and the concept of the example embodiments is fully conveyed to those skilled in the art. The same reference numerals of the accompanying drawings denote the same or similar structure and thus, their detailed description will be omitted.

Although the relative terms such as "upper" and "lower" are used in the specification to describe the relative relationship of one component to another component marked in the drawings, these terms are used in the present specification for convenience only, for example, according to the direction of the example described in the accompanying drawings. It can be understood that if the device marked in the drawings is flipped upside down, the described component at the "upper" side will become the component at the "lower" side. When a structure is "on" another structure, it may mean that a structure is integrally formed on the other structure, or mean that a structure is "directly" arranged on the other structure, or mean that a structure is "indirectly" arranged on the other structure through another structure.

As shown in FIG. 1, a frame structure is provided, where the frame structure can be used in liquid crystal display products. Specifically, the back plate 1 and the middle frame 2 in the frame structure are connected through a buckle 4. Compared with the solution of using fasteners, such as screws, to connect the middle frame 2 and the back plate 1, on one hand, the appearance quality of the product can be improved and, on the other hand, it is convenient for the disassembly and assembly between the middle frame 2 and the back plate 1.

Figure 2:
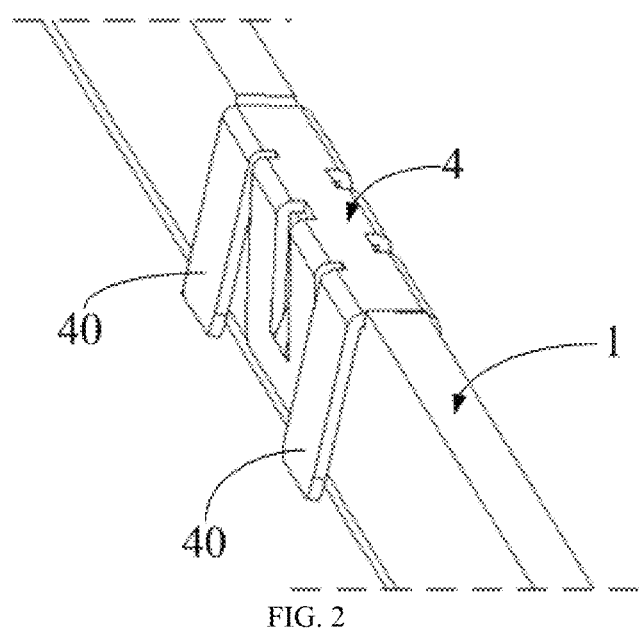
FIG. 2 shows the assembly diagram of a back plate and a buckle in a frame structure described in an embodiment of the present application.

In the present embodiment, the buckle 4 is installed on the back plate 1, as shown in FIG. 2. The buckle 4 includes a plurality of buckle elastic slices 40 in a spaced arrangement, where each buckle elastic slice 40 is engaged with the middle frame 2. After using this kind of buckle to connect the back plate 1 and the middle frame 2, if the middle frame 2 is to be disassembled from the back plate 1, the middle frame 2 needs to be squeezed by external force, so that a plurality of buckle elastic slices 40 can be deformed to detach from middle frame 2. However, since there are a plurality of buckle elastic slices 40, it is difficult to simultaneously detach a plurality of buckle elastic slices 40 by means of squeezing the middle frame 2, and the disassembly efficiency between the middle frame 2 and the back plate 1 is greatly reduced. Moreover, liquid crystal display products increasingly require lighter and thinner specifications, the back plate 1 and the middle frame 2 are usually made thinner. If a plurality of buckle elastic slices 40 is simultaneously detached by means of squeezing the middle frame 2, the middle frame 2 and the back plate 1 are easily crushed, and the stability of the product structure is lowered.

Figure 3:
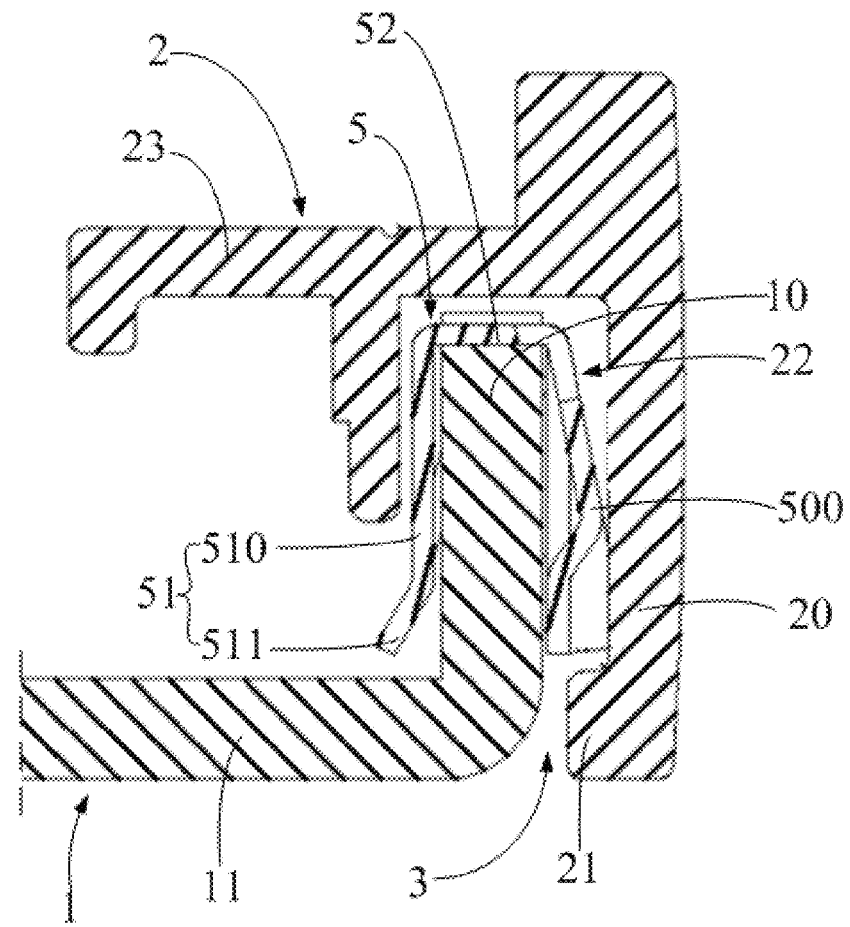
FIG. 3 shows the partially cross-sectional view of a frame structure described in another embodiment of the present application.

In order to solve the problems generated by the above-mentioned embodiment, a frame structure is further provided, as shown in FIG. 3. The frame structure can include a back plate 1, a middle frame 2, and a buckle 5. A notable difference between the frame structure of the present embodiment and the frame structure in the foregoing embodiment is the buckle structure. By changing the buckle structure, easy disassembly of the middle frame and the back plate can be ensured while the structural stability of the back plate and the middle frame during the disassembly process is also ensured.

The frame structure of the present embodiment will be explained in detail below with reference to the accompanying drawings.

Figure 4:
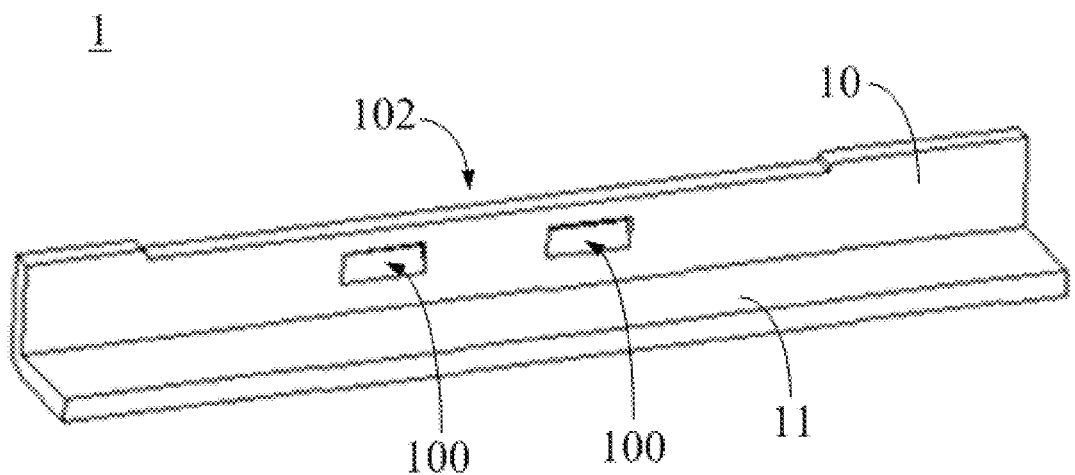
FIG. 4 shows the partial structure diagram of a frame structure described in another embodiment of the present application.

The back plate 1 can be made of metal materials to ensure the structure stability thereof, but is not limited thereto. The back plate 1 can also be made of other materials (such as plastic, etc.), depending on the specific working conditions or product requirements. Specifically, the back plate 1 can have a first side wall 10, as shown in FIG. 3 and FIG. 4. The back plate 1 can further have a bottom plate 11, and the first side wall 10 can be arranged at the edge of the bottom plate 11. For example, the first side wall 10 can be a ring-shaped structure. The first side wall 10 and the bottom plate 11 can surround to form an accommodating space, and the accommodating space can be used for accommodating the light-emitting elements in the backlight module. It should be understood that the bottom plate 11 and the first side wall 10 can be integrally formed, but is not limited thereto. The bottom plate 11 and the first side wall 10 can also be installed together by means of connection methods such as welding, etc.

The middle frame 2 can be made of metal materials to ensure the structure stability thereof, but is not limited thereto. The middle frame 2 can also be made of other materials (such as plastic, etc.), depending on the specific working conditions or product specifications. Specifically, as shown in FIG. 3, the middle frame 2 can be assembled on the back plate 1. The middle frame 2 has a second side wall 20, where the second side wall 20 is located outside the first side wall 10 of the back plate 1. For example, the second side wall 20 can be a ring-shaped structure, but is not limited thereto. In an embodiment, a support portion 23 protruding in a direction close to the first side wall 10 can be arranged on the top end of the second side wall 20. For example, the support portion 23 can be a ring-shaped structure, but is not limited thereto. The support portion 23 can be used to support structures such as the display screen, the optical film in backlight modules, etc. A position limiting portion 21 protruding in a direction close to the first side wall 10 can be arranged on the bottom end of the second side wall 20. For example, the position limiting portion 21 can be a ring-shaped structure, but is not limited thereto. The position limiting portion 21 and the second side wall 20 can surround to form a position limiting slot 22, and a disassembly opening 3 connected with the outside is arranged between the position limiting portion 21 and the first side wall 10.

Figure 5:
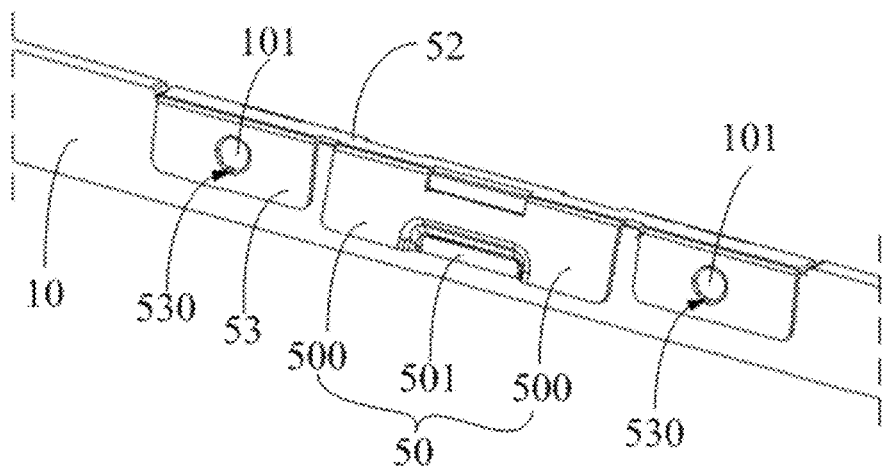
FIG. 5 and FIG. 6 show the assembly diagram of a back plate and a buckle in a frame structure described in another embodiment of the present application, respectively.

The buckle 5 can be made of metal materials to ensure the structure stability thereof, but is not limited thereto. The buckle 5 can also be made of other materials (such as plastic, etc.), depending on the specific working conditions. Specifically, as shown in FIG. 3 and FIG. 5, the buckle 5 can be assembled on the first side wall 10. The buckle 5 can include a buckle elastic slice 50. The buckle elastic slice 50 is located between the first side wall 10 and the second side wall 20, and a retreat space exists between the buckle elastic slice 50 and the first side wall 10. The buckle elastic slice 50 has a buckle portion 500 and a disassembly slot 501, and the buckle portion 500 can be integrally formed with the disassembly slot 501, that is, the buckle elastic slice 50 can be an integrated structure. In an embodiment, the buckle portion 500 can protrude in a direction close to the second side wall 20 and be located inside the position limiting slot 22, while the disassembly slot 501 is recessed in a direction away from the second side wall 20 and has a notch opposite to the disassembly opening 3. Specifically, the disassembly slot 501 can be arranged at the bottom edge of the buckle elastic slice 50.

In the present embodiment, a disassembly slot 501 with a notch is arranged on the buckle elastic slice 50, and the notch is opposite to the disassembly opening 3 formed between the back plate 1 and the middle frame 2. Thus, if the middle frame 2 is to be disassembled from the back plate 1, a disassembly tool (for example, structure with a certain rigidity, such as a disassembly knife, etc.) can be inserted from the disassembly opening 3 facing the notch, and then the disassembly tool is used to press the buckle elastic slice 50 and make the buckle elastic slice 50 to integrally move toward the position where the first side wall 10 is located, so that the buckle portion 500 of the buckle elastic slice 50 is detached from the position limiting slot 22, and the separation of the middle frame 2 and the back plate 1 can be realized. In the present embodiment, the middle frame 2 and the back plate 1 do not need to be squeezed (that is, the middle frame 2 or the back plate 1 does not need to be deformed) to realize the separation of the buckle portion 500 from the position limiting slot 22, so that the structure stability during the disassembly process of the back plate 1 and the middle frame 2 can be ensured, and the disassembly efficiency between the middle frame 2 and the back plate 1 can also be improved.

Moreover, in the present embodiment, the middle frame 2 and the back plate 1 do not need to be squeezed (that is, the middle frame 2 or the back plate 1 does not need to be deformed) to realize the separation of the buckle portion 500 from the position limiting slot 22. Therefore, the middle frame 2 and the back plate 1 can be made thinner so as to realize a narrow frame design for a display product.

Optionally, as shown in FIG. 5, the buckle elastic slice 50 can be arranged with a plurality of buckle portions 500, to ensure the connection stability of the back plate 1 and the middle frame 2. In an embodiment, a plurality of buckle portions 500 can be distributed on the opposite sides of the disassembly slot 501. Thus, a plurality of buckle portions 500 can be ensured to detach from the slot simultaneously, thereby ensuring the connection stability of the back plate 1 and the middle frame 2, and also improving the disassembly efficiency of middle frame 2 and the back plate 1.

In the present embodiment, the buckle 5 is detachably connected with the first side wall 10 of the back plate 1. Thus, when the buckle 5 is damaged, only the buckle needs to be replaced to reduce the maintenance cost of the product.

Figure 6:
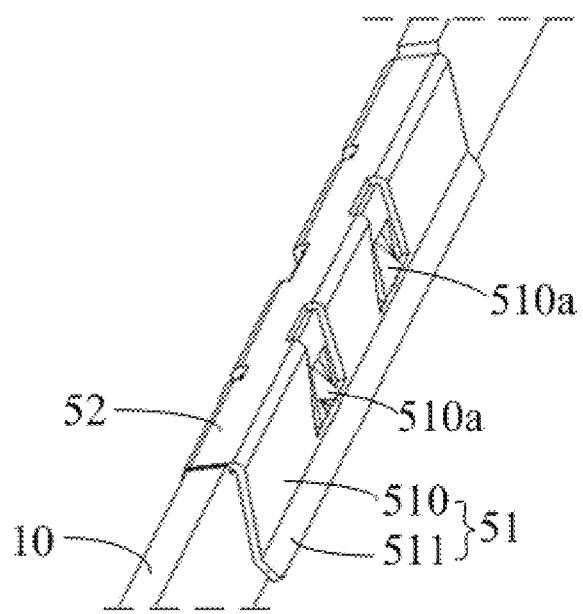

Specifically, as shown in FIG. 4 and FIG. 6, at least one first positioning portion 100 is arranged on the inner side surface of the first side wall 10. The buckle 5 can further include a first fixing slice 51 located on the inner side of the first side wall 10 and a connecting slice 52 connecting the first fixing slice 51 and the buckle elastic slice 50. The first fixing slice 51 has a first match portion 510a engaged with the first positioning portion 100. By engaging the first match portion 510a with the first positioning portion 100, the positioning connection of the buckle 5 and the back plate 1 can be realized.

Since the accommodating space of the back plate 1 needs to be assembled with some other structures, in order to reduce the space occupied by the first fixing slice 51, the first fixing slice 51 needs to be designed thinner. In this case, in order to ensure the positioning connection of the first fixing slice 51 and the first side wall 10, as shown in FIG. 4 and FIG. 6, as an example, the first positioning portion 100 is a positioning slot, and the first match portion 510a is a positioning latch, and the positioning latch can be engaged inside the positioning slot.

It should be noted that the production method of the positioning latch in the first fixing slice 51 can be that: a part of the first fixing slice 51 is divided, and only one end of the divided part of the first fixing slice 51 is connected with the other parts of the first fixing slice 51, and the other end of the divided part of the first fixing slice 51 is inclined to a position where the buckle elastic slice 50 is located by an external force to form a positioning latch. However, it should be understood that the production method of the positioning latch in the first fixing slice 51 is not limited thereto, and other production methods can be adopted.

In an embodiment, as shown in FIG. 6, in order to facilitate the buckle 5 to be assembled on the first side wall 10, the first fixing slice 51 can be designed to include a fixed main body portion 510 and an inclined guide portion 511. The fixed main body portion 510 has the above-mentioned first match portion 510a, where the inclined guide portion 511 is arranged on the bottom end of the fixed main body portion 510 and is inclined in a direction away from the first side wall 10. It should be noted that, in order to reduce the space occupied by the first fixing slice 51, the inclination angle should not be too large, and can be from 5° to 20°, but is not limited thereto. The inclination angle can also be other values depending on the specific situation.

Optionally, as shown in FIG. 4, an installation slot 102 can be arranged on the top surface of the first side wall 10 in the back plate 1, and the connecting slice 52 of the buckle 5 can be installed in the installation slot 102, as shown in FIG. 4 to FIG. 6, to further restrict the position of the buckle 5, thereby ensuring the assembly stability of the back plate 1 and the buckle 5.

In an embodiment, as shown in FIG. 5, the thickness of the connecting slice 52 should be less than or equal to the slot depth of the installation slot 102. That is to say, the top surface of the connecting slice 52 is lower than the top surface of the first side wall 10 (that is, the top surface of the connecting slice 52 is closer to the slot bottom of the installation slot 102 than the top surface of the first side wall 10) or the top surface of the connecting slice 52 is flush with the top surface of the first side wall 10. Compared with the solution that the thickness of the connecting slice 52 should be greater than the slot depth of the installation slot 102, when the middle frame 2 is assembled on the back plate 1, the contact area of the middle frame 2 and the back plate 1 can be increased, thereby ensuring the middle frame 2 is stably installed on the back plate 1.

Optionally, in order to further ensure the assembly stability of the buckle 5 and the first side wall 10, as shown in FIG. 5, the buckle 5 can further include a second fixing slice 53 connected with the connecting slice 52, where the second fixing slice 53 is located between the first side wall 10 and the second side wall 20. In an embodiment, a second positioning portion 101 can be arranged on the outer side surface of the first side wall 10, and the connecting slice 52 can have a second match portion 530 engaged with the second positioning portion 101.

In order to realize the narrow frame design of the product, the gap between the first side wall 10 and the second side wall 20 is usually smaller. Therefore, in the present embodiment, the second fixing slice 53 needs to be designed thinner. In order to ensure the positioning connection of the second fixing slice 53 and the first side wall 10, as shown in FIG. 5, in an example, the second positioning portion 101 is a positioning protrusion, and the second match portion 530 is a positioning through-hole. In an embodiment, the positioning protrusion is engaged inside the positioning through-hole.

It should be noted that, in order to avoid affecting the assembly stability of the buckle 5 and the first side wall 10 when the middle frame 2 is disassembled, the second fixing slice 53 and the buckle elastic slice 50 can be in a spaced arrangement. Thus, the second fixing slice 53 will not be driven to move during the buckle elastic slice 50 moving toward the first side wall 10, thereby ensuring the assembly stability of the second fixing slice 53 and the first side wall 10. Moreover, the spaced arrangement of the second fixing slice 53 and the buckle elastic slice 50 can also increase the elasticity of the buckle elastic slice 50.

Additionally, as shown in FIG. 5, a plurality of second fixing slices 53 can be arranged and distributed on opposite sides of the buckle elastic slice 50 to further ensure the assembly stability of the buckle and the back plate 1.

The present application also provides a backlight module, and the backlight module includes a light-emitting component (not shown in the figure) and the frame structure described in any of the foregoing embodiments. The light-emitting component can be arranged on the inner side the first side wall 10, that is, the light-emitting component is arranged in the accommodating space of the back plate 1. For example, the light-emitting component can be arranged on the first side wall 10 of the back plate 1. At this time, the backlight module can be a side-entry backlight module. When the backlight module is a side-entry backlight module, the backlight module can further include a light guide plate. It should be understood that the light-emitting component can also be arranged on the bottom plate 11 of the back plate 1. At this time, the backlight module can be a straight down backlight module.

In an embodiment, the backlight module not only includes a light-emitting component and a frame structure, but also further includes other structures, such as an optical film, etc.

The present application also provides a display device. The display device can be a liquid crystal display device. The liquid crystal display device can include a display panel (not shown in the figure) and the backlight module described in the foregoing embodiment, and the display panel is assembled on one side of the middle frame 2 in the backlight module away from the back plate 1.

According to the embodiments of the present application, the specific type of the display device is not particularly limited, and the types of display devices commonly used in the art are all available, specifically, for example, liquid crystal display devices, mobile devices, such as mobile phones, wearable devices such as watches, VR devices, etc. Those skilled in the art can make corresponding selections according to the specific use of the display device, and it is not described here in detail.

It should be noted that, in addition to the backlight module, the display device further includes other necessary components and compositions, specifically, such as a housing, a circuit board, a power cord, etc. Those skilled in the art can make corresponding supplements according to the specific use requirements of the display device, and it is not described here in detail The terms "one", "a/an", "the", "said" are used to indicate that there is one or more elements, components, etc. The terms "include" and "have" are used to indicate open-ended inclusion and mean that there can be additional elements, components, etc. in addition to the listed elements, components, etc. The terms "first", "second", etc. are used only as markers, not as a limitation on the number of objects.

After considering the specification and practicing the application herein, those skilled in the art will easily think of the other embodiments of the present application. The present application is intended to cover any variations, uses, or adaptive changes of the present application, and these variations, uses, or adaptive changes are in accordance with the general principles of the present application and include common general knowledge or conventional technical means in the art that are not disclosed in the present application. The specification and the embodiment are only regarded as exemplary, and the true scope and spirit of the present application are indicated by the appended claims.

What is claimed is:

1. A frame structure, comprising:
    a back plate having a first side wall;
    a middle frame being assembled on the back plate, the middle frame having a second side wall located outside the first side wall and a position limiting portion protruding in a direction close to the first side wall being arranged on the bottom end of the second side wall, and the position limiting portion and the second side wall surrounding to form a position limiting slot, and a disassembly opening connected with an outside being arranged between the position limiting portion and the first side wall; and
    a buckle being assembled on the first side wall, the buckle comprising a buckle elastic slice located between the first side wall and the second side wall, wherein a retreat space exists between the buckle elastic slice and the first side wall, and the buckle elastic slice having a buckle portion and a disassembly slot, the buckle portion protruding in a direction close to the second side wall and being located inside the position limiting slot, and the disassembly slot being recessed in a direction away from the second side wall and having a notch opposite to the disassembly opening.

2. The frame structure according to claim 1, wherein a plurality of buckle portions are arranged and distributed on the opposite sides of the disassembly slot.

3. The frame structure according to claim 1, wherein:
    at least one first positioning portion is arranged on the inner side surface of the first side wall; and
    the buckle further comprises a first fixing slice located on the inner side of the first side wall and a connecting slice connecting the first fixing slice and the buckle elastic slice, the first fixing slice having a first match portion engaged with the first positioning portion.

4. The frame structure according to the claim 3, wherein the first positioning portion is a positioning slot, the first match portion is a positioning latch, and the positioning latch is engaged inside the positioning slot.

5. The frame structure according to claim 3, wherein the first fixing slice comprises a fixed main body portion and an inclined guide portion, the fixed main body portion has the first match portion, and the inclined guide portion is arranged on the bottom end of the fixed main body portion and is inclined in a direction away from the first side wall.

6. The frame structure according to claim 3, wherein an installation slot is arranged on the top surface of the first side wall, and the connecting slice is installed in the installation slot.

7. The frame structure according to claim 6, wherein a thickness of the connecting slice is less than or equal to the slot depth of the installation slot.

8. The frame structure according to claim 4, wherein:
    the buckle further comprises a second fixing slice connected with the connecting slice, and the second fixing slice is located between the first side wall and the second side wall; and
    a second positioning portion is arranged on the outer side surface of the first side wall, and the connecting slice has a second match portion engaged with the second positioning portion.

9. The frame structure according to the claim 8, wherein the second positioning portion is a positioning protrusion, the second match portion is a positioning through-hole, and the positioning protrusion is engaged inside the positioning through-hole.

10. The frame structure according to the claim 8, wherein the second fixing slice and the buckle elastic slice is in a spaced arrangement.

11. The frame structure according to claim 8, wherein a plurality of the second fixing slices are arranged and distributed on the opposite sides of the buckle elastic slice.

12. A backlight module, comprising:
    a light-emitting component; and
    a frame structure, comprising:
        a back plate having a first side wall;
        a middle frame being assembled on the back plate, the middle frame having a second side wall located outside the first side wall and a position limiting portion protruding in a direction close to the first side wall being arranged on the bottom end of the second side wall, and the position limiting portion and the second side wall surrounding to form a position limiting slot, and a disassembly opening connected with an outside being arranged between the position limiting portion and the first side wall; and
        a buckle being assembled on the first side wall, the buckle comprising a buckle elastic slice located between the first side wall and the second side wall, wherein a retreat space exists between the buckle elastic slice and the first side wall, and the buckle elastic slice having a buckle portion and a disassembly slot, the buckle portion protruding in a direction close to the second side wall and being located inside the position limiting slot, and the disassembly slot being recessed in a direction away from the second side wall and having a notch opposite to the disassembly opening, wherein the light-emitting component is arranged inside the first side wall.

13. A display device, comprising:
    a display panel;
    a backlight module comprising a light-emitting component; and
    a frame structure, comprising:
        a back plate having a first side wall;
        a middle frame being assembled on the back plate, the middle frame having a second side wall located outside the first side wall and a position limiting portion protruding in a direction close to the first side wall being arranged on the bottom end of the second side wall, and the position limiting portion and the second side wall surrounding to form a position limiting slot, and a disassembly opening connected with an outside being arranged between the position limiting portion and the first side wall; and
        a buckle being assembled on the first side wall, the buckle comprising a buckle elastic slice located between the first side wall and the second side wall, wherein a retreat space exists between the buckle elastic slice and the first side wall, and the buckle elastic slice having a buckle portion and a disassembly slot, the buckle portion protruding in a direction close to the second side wall and being located inside the position limiting slot, and the disassembly slot being recessed in a direction away from the second side wall and having a notch opposite to the disassembly opening, wherein the display panel is assembled on one side of the middle frame away from the back plate.

\* \* \* \* \*